Figure 1:
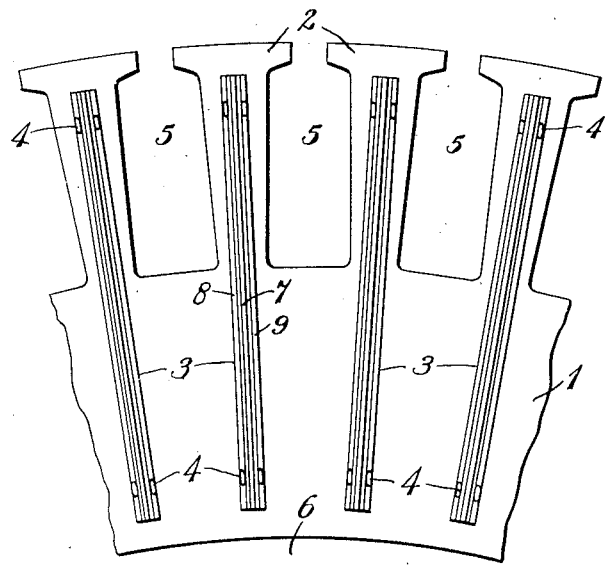

C. B. AUEL.
VENTILATING PLATE AND SPACER FOR ELECTRICAL APPARATUS.
APPLICATION FILED JAN. 7, 1911.

1,221,013.

Patented Apr. 3, 1917.

WITNESSES:
Fred. H. Miller

INVENTOR
Carl B. Auel
BY
ATTORNEY

UNITED STATES PATENT OFFICE.

CARL B. AUEL, OF WILKINSBURG, PENNSYLVANIA, ASSIGNOR TO WESTINGHOUSE ELECTRIC AND MANUFACTURING COMPANY, A CORPORATION OF PENNSYLVANIA.

VENTILATING PLATE AND SPACER FOR ELECTRICAL APPARATUS.

1,221,013.

Specification of Letters Patent. Patented Apr. 3, 1917.

Application filed January 7, 1911. Serial No. 601,338.

*To all whom it may concern:*

Be it known that I, CARL B. AUEL, a citizen of the United States, and a resident of Wilkinsburg, in the county of Allegheny and State of Pennsylvania, have invented a new and useful Improvement in Ventilating Plates and Spacers for Electrical Apparatus, of which the following is a specification.

My invention relates to the ventilation of electrical apparatus and it has special reference to ventilating plates and spacing fingers employed in laminated magnetizable core structures for the purpose of providing ventilating passages or air ducts.

The object of my invention is to provide a ventilating or spacing device of the above-indicated character which shall be simple, rigid and durable in construction, and the component parts of which may be cheaply manufactured and readily and economically assembled.

Heretofore various devices have been employed for the purpose above specified, but usually they have embodied spacing fingers having tongues which projected through registering slots in the ventilating plates and were bent over against the back of the plates in order to securely fasten the spacing fingers in position. With this construction the tongues and slots had to be accurately spaced and fitted, the one within the other, after which the plate was turned over and the tongues headed down in engagement with the plate.

The strength and rigidity of such structures depended upon the number and size of the tongues provided for securing the fingers to the plates, and the greater the number of tongues and slots, the more care and labor were required to mount the fingers in position. Another disadvantage of spacing devices heretofore employed, resides in the fact that the spacing fingers have either been of unsymmetrical form with respect to their opposite ends, or the tongue portions have been located unsymmetrically, which necessitated that the fingers be assembled in a particular relation to the plates which involved considerable care and time. Also, by reason of the unsymmetrical form of the fingers and location of the tongues, a large number of dies were required to produce fingers of the proper lengths for a variety of types and sizes of machines.

According to my invention, I provide straight spacing fingers of symmetrical form, having central longitudinal portions of substantially V-shape section, and flat longitudinal flanges on the respective sides thereof, said flanges being of substantially the full length of said fingers and severally adapted to be entirely disposed on one side of an unslotted ventilating plate and to rest against the surface thereof. Inasmuch as the fingers are symmetrical in form and have no tongue portions, they may be quickly assembled in position without regard to their ends, and without the necessity of unusual care.

The symmetrical construction of the spacing fingers also makes them particularly well adapted for commercial manufacture, on a large scale, as they may be punched, or otherwise produced, in large numbers of the same size and may be adapted for use with a variety of sizes of machines, merely by cutting off either end to the required length.

In assembling, the fingers are laid in position on the plate and spot-welded, fused or otherwise attached thereto at a sufficient number of places along the flanges to provide a rigid and durable structure. During this process, it is unnecessary to turn the plate over but all of the work may be accomplished on one side thereof, thereby reducing the labor and expense of assembling.

Moreover, the operation of punching slots in the plates is dispensed with, and the fingers are located entirely on one side thereof, whereby the space usually occupied by the bent-over tongue members is economized.

Thus, inexpensive and strong spacing fingers are provided which may be readily adapted for a wide range of sizes of machines and which may be economically assembled and securely fastened to the ventilating plates to form a compact, cheap and improved ventilating or spacing device.

Figure 2:
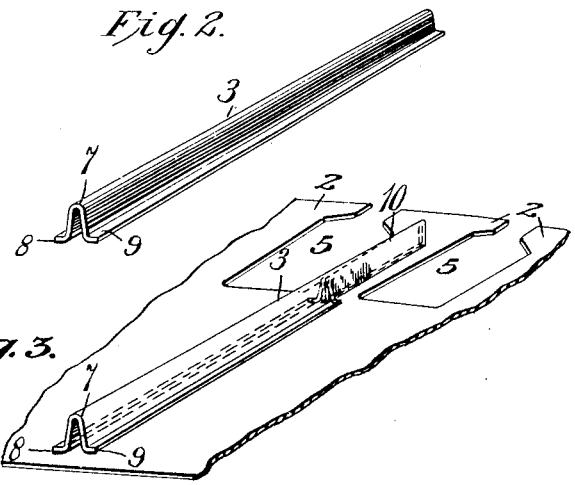
Figure 3:
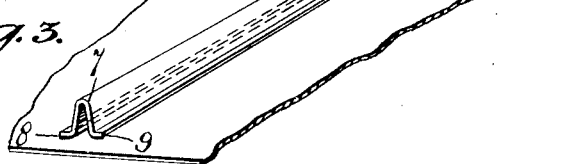

In the accompanying drawings, Figure 1 is a fragmentary face view of a device constructed in accordance with my invention, Fig. 2 is a perspective view of one of the spacing fingers shown in Fig. 1, and Fig. 3 is a perspective view of a modified form of my invention.

Referring to the drawing, a ventilating plate 1, having a plurality of radially-projecting teeth 2, is provided with a plurality of spacing fingers 3 which are severally radially disposed on the center lines of the teeth 2 and are welded, fused or otherwise attached to the plate at one or more spots 4, being severally entirely disposed on one side thereof. The ventilating plate 1 is of the usual punched construction and, except for the teeth 2, slots 5, and central opening 6, is provided with no additional openings or projections.

Referring particularly to Figs. 1 and 2, the spacing fingers 3 are of like construction and each preferably comprises a punching of sheet metal having a centrally located longitudinal portion 7 of V-shape in cross section and parallel longitudinal side flanges 8 and 9 which are disposed in a plane that is substantially at right angles to that of the V-shaped central portion and extend approximately the full length of the finger. A particularly advantageous feature possessed by this type of spacing finger is that it is symmetrical in form and may thus be assembled readily and without difficulty.

In assembling the device, the spacing fingers 3 are placed radially along the center lines of the teeth 2 with the side flanges 8 and 9 in contact with the ventilating plate 1, after which they are secured thereto by a welding process or other suitable manner.

When the construction of the ventilating plate 1 is such that the teeth 2 are very narrow, it will be found expedient to employ the modified type of spacing finger 3 illustrated in Fig. 3. This spacer is similar to that hereinbefore shown and described except that portions of the side flanges 8 and 9 are removed from one end thereof and the sides of the V-shaped portion 7 are pressed into intimate contact with each other to form a rigid and narrow end portion 10.

In assembling the modified spacing finger 3, it is so placed upon the ventilating plate 1 that the narrow end portion 10 is located on a tooth 2. The finger is then secured to the ventilating plate by spot-welding the flanges 8 and 9 thereto, or by other suitable means.

Although I find it preferable and economical to spot-weld the spacing fingers to the ventilating plate, my invention is not restricted in this particular, as other means may be employed to accomplish the desired result. Furthermore, modifications in structural details and in the shapes and relative proportions of the component parts may be effected without exceeding the scope of my invention.

I claim as my invention:

1. In a laminated structure, the combination with a plate, of a plurality of straight radial spacing fingers severally entirely disposed on one side of said plate and secured thereto, said fingers severally comprising a longitudinal V-shaped central portion and outer longitudinal side portions substantially at right angles to said central portion.

2. A ventilating device for magnetizable cores comprising a plate and a plurality of straight spacing fingers severally entirely disposed on and united to one side of said plate, each of said fingers comprising a long and narrow strip having a centrally located V-shaped longitudinal portion and outer longitudinal side flanges.

3. Ventilating means for laminated magnetizable core structures comprising a plate having a plurality of narrow radially projecting teeth, and a plurality of spacing fingers radially disposed upon the center lines of said teeth and welded to said plate, one end of each finger being V-shaped in cross section and having longitudinal side flanges, the other end having the sides of said V-shaped portion in intimate contact with each other and having no side flanges.

4. A spacing finger for laminated structures comprising a punched metallic member, one end of which is of V-shape section and provided with long side flanges and the other end having the side portions of said V-shaped member in intimate contact.

In testimony whereof, I have hereunto subscribed my name this 29th day of Dec., 1910.

CARL B. AUEL.

Witnesses:
H. F. MacLane,
B. B. Hines.